United States Patent Office 3,116,279
Patented Dec. 31, 1963

3,116,279
PROCESS FOR OXIDIZING HYDROQUINONYL RADICALS PRESENT IN DYES TO QUINONYL RADICALS
Richard S. Corley, Wellesley Hills, Mass., assignor to Polaroid Corporation, Cambridge, Mass., a corporation of Delaware
No Drawing. Filed Dec. 3, 1957, Ser. No. 700,276
3 Claims. (Cl. 260—197)

This invention relates to novel chemical processes and more particularly to novel oxidation processes.

It is one object of this invention to provide novel processes for selectively oxidizing hydroquinonyl radicals, which are present in dye molecules, to quinonyl radicals without substantially altering other segments of the dye molecule.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

There are many known oxidizing processes and reagents for converting hydroquinones to quinones; but when one is faced with the problem of selectively oxidizing a hydroquinonyl radical present in a dye molecule to a quinonyl radical without altering other segments of the dye molecule, well known oxidizing agents such as permanganates, manganese dioxides, chromates, dichromates, cerates, vanadates, vanadium pentoxides, persulfates, halogens, chlorates, bromates, iodates, hypochlorides, tetravalent lead compounds, etc., are either too strong in themselves or the conditions required are such that other segments of the molecule will be affected.

It has been discovered that through the use of the processes herein disclosed, wherein mercuric acetate is the oxidizing agent, unsubstituted and halogen, alkyl and alkoxy substituted hydroquinonyl radicals present in a dye molecule may be selectively oxidized, in good yields, to the corresponding quinonyl radicals without substantially affecting other segments of the dye molecule. The processes of this invention are especially applicable to dyes wherein the hydroquinonyl radical is attached to the dye system by means of a carbon to carbon covalent bond.

The processes of the invention are particularly useful on azo dyes containing a hydroquinonyl radical. As examples of such dyes, mention may be made of the azo dyes disclosed and claimed in the copending U.S. applications of Elkan R. Blout, Milton Green and Howard G. Rogers, Serial No. 612,045, and Myron S. Simon, Serial No. 612,053, both filed on September 25, 1956, both now abandoned of which the following are specific illustrations:

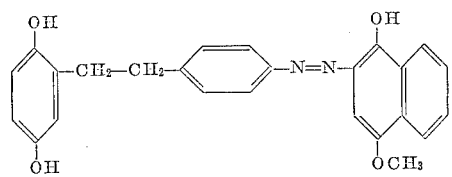

2-[p-(2',5'-dihydroxyphenethyl)-phenylazo]-4-methoxy-1-naphthol

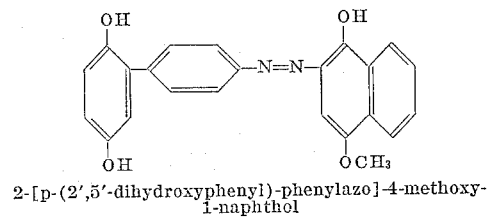

2-[p-(2',5'-dihydroxyphenyl)-phenylazo]-4-methoxy-1-naphthol

The processes of the invention are also particularly useful on anthraquinone dyes containing hydroquinonyl radicals. As examples of such anthraquinone dyes, mention may be made of those claimed and disclosed in the copending United States application of Elkan R. Blout, Marilyn R. Cohler, Milton Green, Myron S. Simon and Robert B. Woodward, Serial No. 478,922, filed December 30, 1954, now abandoned, of which the following is a specific illustration:

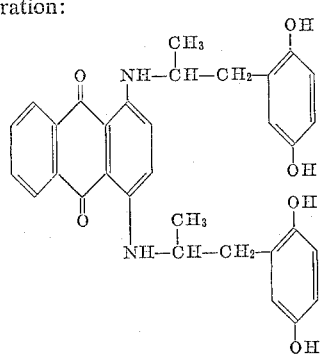

1,4-bis-[beta-(2',5'-dihydroxyphenyl)-alpha-methyl-ethylamino]-anthraquinone

In carrying out the processes of this invention the dye containing the hydroquinonyl radical is reacted, while open to the air, with an excess, and preferably a 15 to 20% molar excess of mercuric acetate in an inert solvent. The reaction may be carried out at room temperature or at elevated temperatures not appreciably in excess of 100° C. The rate of reaction will vary with particular dyes and the temperature conditions employed. At room temperature the reaction proceeds at a moderate rate and is generally substantially completed upon standing overnight. In the 80 to 100° C. range, the reaction proceeds quite rapidly and in most cases is substantially completed in one-half to four hours.

The inert solvent in which the reaction takes place is preferably one in which both the dye and mercuric acetate are soluble and the resulting mercurous acetate is insoluble. As examples of solvents useful as reaction mediums in carrying out the present process, mention may be made of dimethylformamide and the monomethyl ether of ethylene glycol.

Upon completion of the reaction, the insoluble mercurous acetate is filtered off and the dye may be separated by any of the well known methods, e.g., extraction, precipitation, etc., and the product may be further purified by recrystallization from a suitable solvent. After making suitable corrections with a blank, the extent of reaction may be conveniently determined from the dry weight of the resulting mercurous acetate.

The following examples illustrate the processes of this invention and are given as illustrations:

*Example 1*

One mol of 1,4-bis-[beta-(2',5'-dihydroxyphenyl)-alpha-methyl-ethylamino]-anthraquinone and a 20% molar excess of mercuric acetate are dissolved in dimethylformamide and reacted, while open to the air, on a steam bath for three to four hours. Upon cooling, the insoluble mercurous acetate is filtered out and the product is precipitated by adding water. By crystallization of the product from an acetone solution containing a small amount of chloroform, 1,4 - bis-[beta-(2',5'-dioxophenyl)-alpha-methylethylamino]-anthraquinone is obtained melting at 209 to 210° C., and showing the following analysis:

|  | C | H | N |
|---|---|---|---|
| Calculated | 71.8 | 4.9 | 5.24 |
| Found | 71.0 | 4.7 | 5.4 |

*Example 2*

One mol of 2-[p-(2',5'-dihydroxyphenylethyl)-phenylazo]-4-methoxy-1-naphthol and a 20% molar excess of mercuric acetate are dissolved in dimethylformamide and reacted, while open to the air, on a steam bath for three to four hours. Upon cooling, the insoluble mercurous acetate is filtered out and the product is precipitated by adding water. By crystallization from a chloroform ethylene glycol monomethyl ether solution, 2-[p-(2',5'-dioxophenethyl)-phenylazo]-4-methoxy-1-naphthol was produced melting at 180 to 182° C. The infrared absorption spectrum of this product exhibited typical quinone bands.

Products obtained in accordance with the teachings of Examples 1 and 2 above may be utilized in photographic processes as described, for instance, in Examples 3 and 4 of the copending application of Howard G. Rogers, Serial No. 599,122, filed July 20, 1956, now abandoned.

Since certain changes may be made in the above process without departing from the scope of the invention herein involved, it is intended that all matter contained in the above description shall be interpreted as illustrative and not in a limiting sense.

What is claimed is:

1. The process which comprises reacting at a temperature between about room temperature and about 100° C. an excess of mercuric acetate with an azo dye containing a hydroquinonyl radical, said hydroquinonyl radical being attached to the dye system through a carbon-to-carbon covalent bond, thereby selectively oxidizing said hydroquinonyl radical to the corresponding quinone radical without affecting other portions of said azo dye, said reaction being carried out in an inert organic solvent in which said azo dye and said mercuric acetate are soluble and in which the resulting mercurous acetate is insoluble, and recovering said quinone oxidation product.

2. A process as defined in claim 1 wherein said excess of mercuric acetate is about a 15 to 20% molar excess.

3. A process as defined in claim 1 wherein said azo dye is 2 - [p-(2',5'-dihydroxyphenethyl)-phenylazo]-4-methoxy-1-naphthol.

References Cited in the file of this patent

UNITED STATES PATENTS 2,357,944 Fieser ----------------- Sept. 12, 1944
2,624,747 Davy ------------------ Jan. 6, 1953

OTHER REFERENCES

Tafel: Ber. Deut. Chem. Ges., volume 25, pages 1619 to 1623 (1892).

Royals: Advanced Organic Chemistry (1956), page 334.

Balbinano et al.: Ber. Deut. Chem. Ges., volume 35, pages 2994 and 2995 (1902).